Feb. 12, 1929.

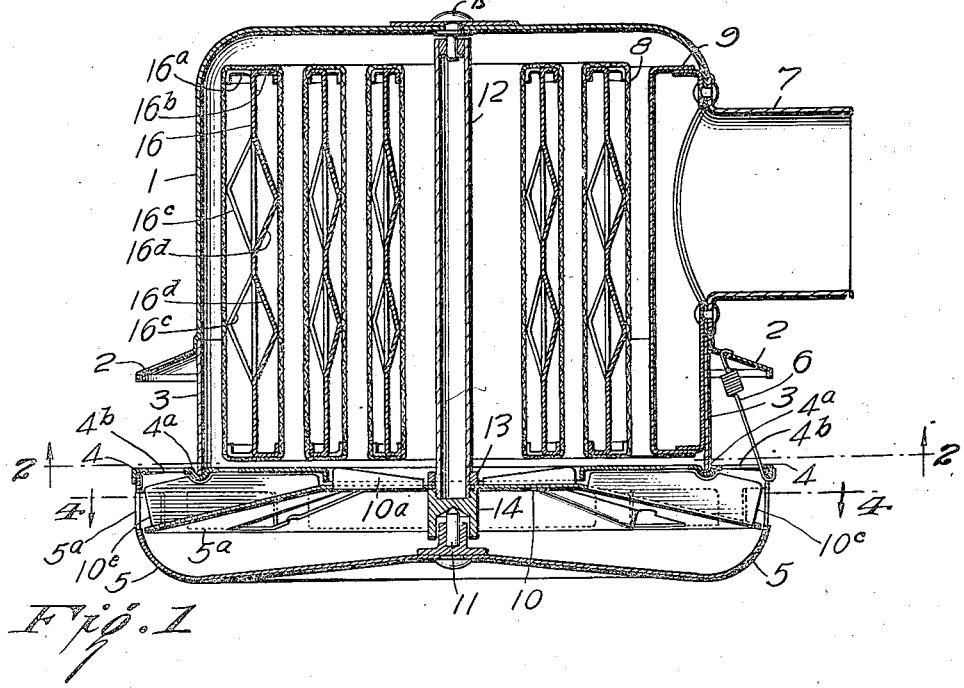
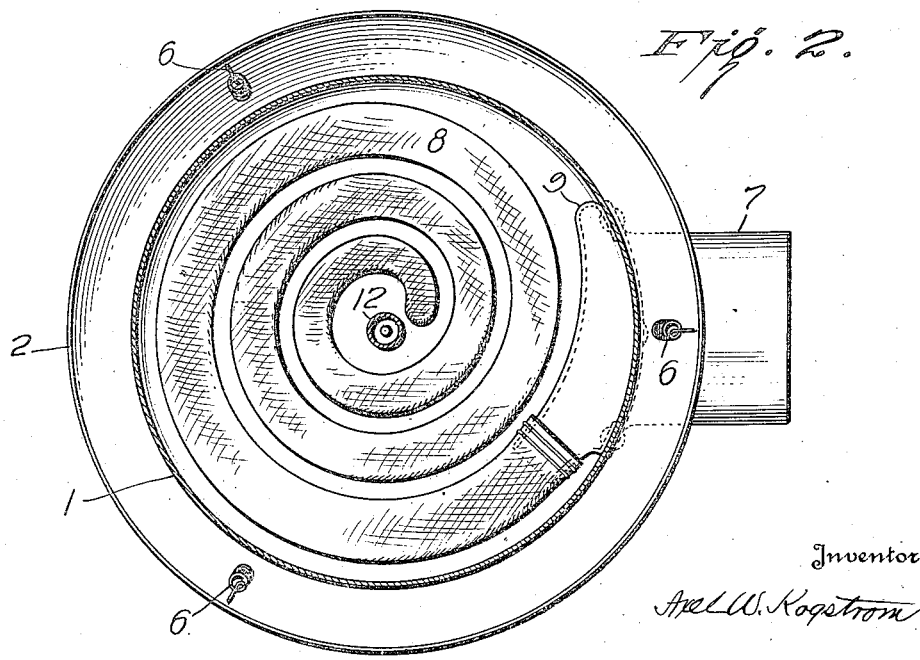

A. W. KOGSTROM 1,701,782

AIR STRAINER

Filed March 17, 1926    2 Sheets-Sheet 2

Inventor
Axel W. Kogstrom
by Attorney

Patented Feb. 12, 1929.

1,701,782

UNITED STATES PATENT OFFICE.

AXEL W. KOGSTROM, OF UPPER DARBY, PENNSYLVANIA, ASSIGNOR OF ONE-HALF TO ALLISON F. H. SCOTT, OF PHILADELPHIA, PENNSYLVANIA.

AIR STRAINER.

Application filed March 17, 1926. Serial No. 95,424.

This invention relates to air cleaners for use principally in cleaning the air which is fed to a carbureter to form with gas the explosive charge in internal combustion engines and the like; the invention herein disclosed being an improvement over the invention described and claimed in my co-pending application, Ser. No. 38,011, filed June 18, 1925. which matured into Patent No. 1,580,905, April 13, 1926.

Heretofore, strainer type filters have been used as air cleaners, but for efficient operation such filters must be of such large dimensions that they are not well suited for convenient use on automobiles, where the available space for mounting such a device is limited.

The object of this invention is to produce an air strainer having high cleaning efficiency and at the same time one which will require only a limited amount of space for its installation.

With this object in view, I have produced an air cleaner in which the air is first subjected to the action of a centrifugal separator, to remove the larger and heavier particles of dirt and dust, and the partially cleaned air is then passed through a filter to remove the remaining finer solid particles or suspended matter which is injurious to the mechanism of an internal combustion motor.

It will be apparent that for any given filter having the highest possible efficiency, by first passing the air to be treated through a centrifugal separator having an efficiency of say, 75%, the useful life of the filter will be four times as great as where the filter alone is used. Thus, by removing a substantial portion of the the dirt and dust from the air by centrifugal means, the filter can be made materially smaller with a resulting decrease in the amount of space required by the cleaner as a whole.

In my co-pending application referred to above, the construction of the air strainer comprises a main housing inclosing a filter element and provided with an outlet passage communicating with the air intake of the carbureter. The main housing is otherwise closed except for an opening in the top for admission of air. In this opening is mounted a rotary turbine element adapted to be operated by the air drawn through the opening. The turbine element also carries impeller or separator blades which serve to separate solid particles of dust and dirt from the incoming air.

I have discovered that if the intake opening of the housing and the rotary separator element are located near the bottom instead of the top of the housing, a much higher percentage of solid matter is separated from the air, by the rotary separator, before entering the filter unit. It will be appreciated that the higher the efficiency of the rotary separator, the longer will be the useful life of the filter unit, which, in time, becomes filled with dust and dirt particles and must be thoroughly cleaned or replaced. The invention in the present case, therefore, is an arrangement in which the air intake of the filter housing and the rotary separator unit are situated at the bottom instead of the top of the housing.

This invention also comprises an improved form of filter unit having a large effective filter surface arranged in compact form.

The invention is shown in the accompanying drawing, in which:

Fig. 1 is a vertical section taken through the center of the combined centrifugal separator and filter;

Fig. 2 is a sectional view of the cleaner taken along the line 2—2 of Fig. 1, showing particularly the arrangement of the filter element;

Figure 3:
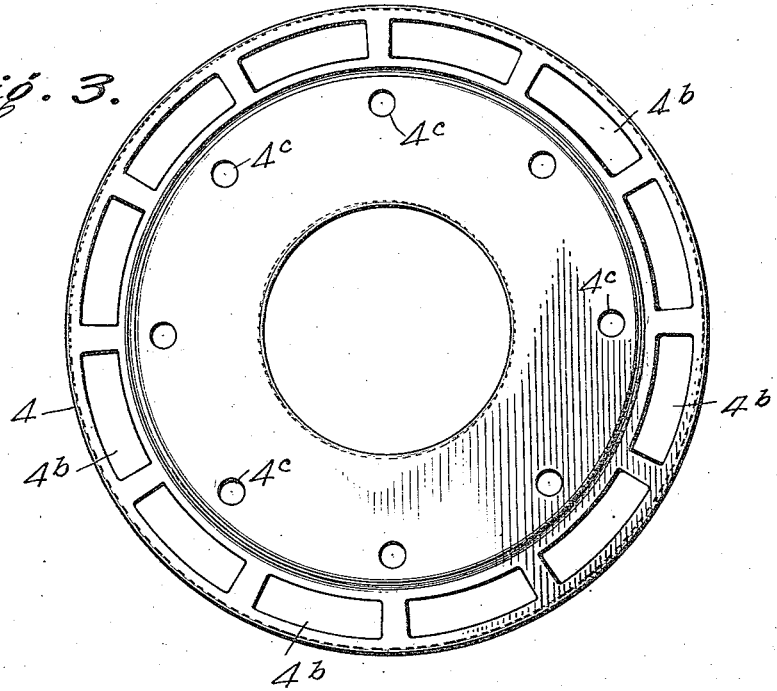
Fig. 3 is a top plan view of a baffle plate which closes the bottom of the filter housing and has formed therein the air intake opening.

In Fig. 1, the main part of the housing or casing is in the form of an inverted cup 1, having an outwardly flared or flanged edge 2, at its open end. Fitting into the open end of the casing 1, and seated against a shoulder formed on the casing, is a cylindrical sleeve 3, constituting a component part of the casing. An annular baffle plate 4, is positioned over the lower or open end of the housing, and is maintained in proper position with respect to the housing by means of the annular depression or groove 4ª, which receives the lower end of sleeve 3. The outer edge of baffle plate 4, is turned down to form a cylindrical flange which receives the upper edge of a cup member 5, which closes the bottom of the housing. The main housing cup 1, sleeve 3, baffle plate 4 and bottom cup 5, are all held in proper assembled relation by a series of spring hooks 6, arranged about the strainer and engaging flange 2 of cup 1, and bottom cup 5, respectively, the tension of the springs tending to draw the two anchor elements together.

Housing cup 1 is provided with an outlet 7, which communicates with the air intake port of the carbureter. A filter element 8, consisting of a long bag or sleeve made of filter material and coiled into a spiral form, is supported within housing 1, and the open end of the bag or filter unit is connected to outlet 7, by means of the hollow connecting member 9. Members 7 and 9 may be secured to the cup 1 in any desired manner, for example, by screws, rivets or otherwise. The details of the filter unit will be hereinafter described.

The separator unit 10 is rotatably supported in cup 5, upon a pivot bearing 11, which is secured at the center of the bottom of cup 5. The separator unit 10, is mounted upon a tubular spindle 12, between nut 13 and bearing 14, both of which are secured onto the lower end of spindle 12. The upper end of spindle 12 is closed with a second bearing member in the form of a plug having a central bearing hole. A pin 15, secured to the top of casing 1, extends into the bearing hole and completes the upper bearing arrangement.

Figure 4:
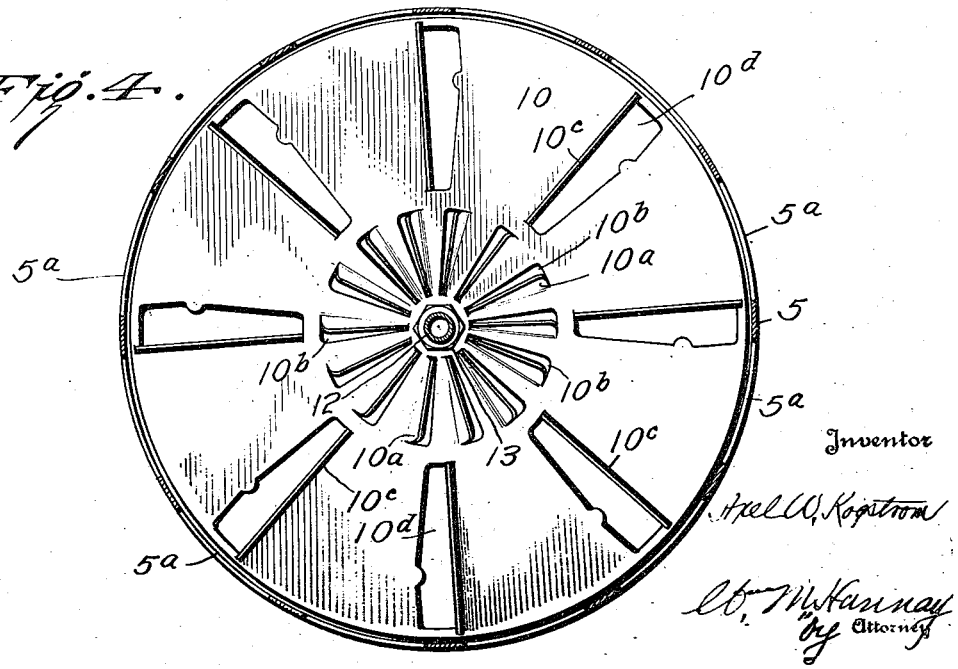
Fig. 4 is a sectional view of the cleaner taken along line 4—4 of Fig. 1, showing the details of the rotary separator unit.

Referring to Figs. 1 and 4, the rotary separator 10 is a disc-shaped element formed from a thin sheet of metal. Near the center of the disc a series of inclined turbine blades 10$^a$, are struck up from the metal, leaving openings 10$^b$, and near the outer edge of the disc, a series of impeller blades 10$^c$ are also struck up from the metal at right angles to the surface, leaving openings 10$^d$. As shown in Fig. 1, that portion of the disc carrying the turbine blades is flat, and the disc is so positioned that the turbine blades are situated within, and rotate within, the central opening of baffle plate 4, which opening constitutes the intake opening of the filter casing. The outer portion of the disc carrying the impeller blades 10$^c$ is frustro-conical in shape, and the impeller blades are so shaped as to closely conform to the under surface of baffle plate 4, except near the outer edge where the blades recede slightly from the plate 4. A series of openings 5$^a$ are formed in the cylindrical wall of cup 5, and it is through these openings that solid particles of dust and dirt are thrown by the impeller blades after being separated from the incoming air by the centrifugal action of the separator. A series of openings 4$^b$ (see Fig. 3) are formed around the periphery of baffle plate 4 to serve as intake passages for the air entering the separator chamber. A second set of holes or openings 4$^c$ are formed in baffle plate 4 on the inside of groove 4$^a$ so as to provide communication between the filter chamber and the separator chamber for a purpose which will appear hereinafter.

The operation of the strainer is as follows: The outlet 7 being connected with the intake of the carbureter, the suction of the engine will cause air to be drawn through the strainer into the carbureter. Air will be drawn from the atmosphere surrounding the strainer, through openings 4$^b$ in baffle plate 4, and will pass downwardly through openings 10$^d$ of the rotary separator into cup 5, thence upwardly through the central opening of baffle plate 4 into filter chamber 1, and after passing through the walls of the filter bag it passes to the carbureter through outlet 7. In passing through the central opening of baffle plate 4 the stream of air acts upon the turbine blades 10$^a$ to rotate the separator unit at a high speed. As the incoming air is drawn into cup 5 through openings 4$^b$, it passes between the rotating impeller blades 10$^c$, and, due to the centrifugal action of the separator, a large percentage of the solid particles of dust and dirt carried by the air will be ejected through openings 5$^a$. Solid particles of dust and dirt which may get past the separator and into the filter chamber 1, will in time settle to the bottom of the chamber and be drawn through holes 4$^c$ in baffle plate 4 by the action of the impeller blades, and will be ejected through openings 5$^a$.

It will be noted that the flanged or flaring edge 2 of casing 1 will serve as a deflector to prevent heavy solid particles directed from above from entering the openings 4$^b$ directly beneath it. This flange also prevents the entrance of water into the cup 5 by way of openings 4$^b$.

The improved filter unit used in my invention consists of a long, flat bag or sleeve 8 made of filter material and having a flexible supporting frame permitting it to be coiled into spiral form. The supporting frame 16 fits within the bag 8 and may be made from a flat strip of sheet metal as follows: A strip of thin sheet metal of the same length as, but somewhat wider than, the bag 8 is cut as a blank. The long edges of this strip are cut at short intervals by short slits at right angles to the length of the strip. Then a series of V-shaped slits are formed in the body of the strip, preferably in two or more spaced rows. The tongues, or the metal inside of the V-shaped slits are then bent out of the plane of the strip, adjacent tongues being bent on different sides of the strip as shown in Fig. 1, 16$^c$ and 16$^d$ are adjacent tongues of one row while 16$^{c'}$ and 16$^{d'}$ are adjacent tongues of another row. It is understood that the slitting and bending operations above described may be performed in one operation. Adjacent portions of the strip between the slits along the edges are also bent to different sides and curled over at the ends to form a supporting side wall for the bag as shown in Fig. 1. 16ª and 16ᵇ are alternate portions bent to the left and right respectively of the strip. In this case, also, it is obvious that the slitting and bending operations may be done at the same time. After the strip is completed, the bag is pulled over the form and both are coiled into spiral form. It will be seen that tongues 16ᶜ and 16ᵈ prevent the side walls of the bag from collapsing and decreasing the effective area of the filter.

While I am not certain as to the principal factors contributing to the improved operation of the form of my invention herein disclosed over the operation of the form of my invention disclosed in my co-pending application, it is probable that by locating the intake of the filter at the bottom instead of the top of the casing, the action of gravity materially assists in separating the suspended solid matter and prevents it from reaching the filter. It is to be noted also that the path of the flow of air is such that substantially all the air that enters the filter chamber has been first subjected to the action of the rotary separator.

I claim:

1. An air cleaner comprising a filter chamber, a separator chamber arranged below the filter chamber and having a passage communicating with the filter chamber, and a separator element having central turbine blades arranged to rotate substantially within the said passage and peripheral impeller blades in communication with the filter chamber to discharge separated matter therefrom.

2. In an air cleaner, the combination of a filter chamber provided with inlet and outlet passages, the inlet passage being located substantially at the bottom of the chamber, a filter arranged within the chamber over the outlet passage, a centrifugal separator arranged within the inlet passage comprising turbine blades and impeller blades, whereby air passing through the cleaner causes the turbine blades to rotate to drive the impeller blades and thereby clean the air by centrifugal action and withdraw separated matter from the filter chamber.

3. An air cleaner comprising a filter chamber having an inlet opening, a filter in said chamber arranged substantially above the inlet opening, an a separator element having turbine blades arranged to rotate substantially within the inlet opening and impeller blades arranged to discharge particles that drop from the filter chamber.

4. In an air cleaner the combination of a filter casing comprising an inverted cup element having a flanged open edge, a cylindrical sleeve inserted in the open end of said cup, a plate having an inlet opening therein arranged over the free end of the sleeve, a separator casing comprising a cup element arranged over the inlet opening, and means for holding all of said elements in fixed relation comprising clamping means engaging the said flanged edge and the separator casing.

5. In an air cleaner the combination of a filter chamber comprising an inverted cup element, a plate having an inlet opening therein arranged over the open end of the cup and extending beyond the wall of the cup, said plate having openings formed therein outside of the wall of the cup, a separator housing comprising an upright cup element engaging the edge of the plate, said separator housing having openings formed around the wall thereof, and a rotary separator unit mounted in said separator housing and having turbine and impeller blades, said turbine blades being arranged to rotate substantially within the inlet opening in said plate and the impeller blades being arranged to rotate below the openings near the outer edge of the said plate and opposite the openings in the wall of the separator housing.

6. In an air cleaner, the combination of a filter chamber comprising an inverted cup element having a flanged open end, a cylindrical sleeve inserted in the open end of the cup, a plate having an inlet opening therein arranged over the open end of the sleeve and extending beyond the sleeve below the cup flange, said plate having openings formed therein outside the sleeve and below the cup flange, a separator housing comprising an upright cup the open end of which engages the edge of said plate, said separator housing having openings formed in the wall thereof near the open end, clamping means engaging said cup flange and said separator housing for holding said elements in position, and a rotary separator unit mounted in said housing and having turbine and impeller blades, said turbine blades being mounted to rotate substantially within the inlet openings of said plate, and the impeller blades being mounted to rotate beneath the outer openings in said plate, and opposite the openings in said separator housing.

7. An air cleaner comprising a filter chamber having an inlet opening in the bottom thereof, a filter in said chamber, a rotary separator element having turbine blades near its center and impeller blades near its periphery, said separator being so mounted that the turbine blades rotate substantially within said inlet opening, said filter chamber being provided with other openings in the bottom around the inlet opening and above said impeller blades whereby separated matter is discharged from the filter chamber.

8. A supporting frame for a filter bag comprising a strip of sheet material having opposite edges slit at intervals along its length, adjacent portions of said strip formed by the slit being bent to opposite sides of the strip.

9. A supporting frame for a filter bag comprising a strip of sheet material, having opposite edges slit at intervals along its length, adjacent portions of said strip formed by the slits being bent to opposite sides of the strip, and a plurality of tongue members formed from the body of the strip and extending from both sides thereof.

10. In a device of the character described, the combination with superposed chambers having suitably arranged inlet and outlet openings, of a filter in the upper chamber and a separator element in the lower chamber comprising impeller blades arranged to rotate and to discharge particles that are separated by and drop from the filter in the upper chamber.

11. In a device of the character described, the combination with superposed chambers having suitably arranged inlet and outlet openings, of a filter in the upper chamber, a perforated diaphragm between said chambers and a separator element in the lower chamber comprising impeller blades arranged to rotate and to discharge particles that enter through the inlet openings of the lower chamber and also particles that are separated by the filter and drop through said diaphragm from the upper chamber.

12. In an air cleaner, a cup shaped member having apertures in its periphery, a cover plate for said member having a central air outlet opening and an air inlet adjacent its periphery, a centrally pivoted element within said member, impeller blades carried by said element adjacent the air inlet opening and the openings in the cup-shaped member, turbine blades carried by said element in the path of the air whereby the pivoted element is caused to rotate and air passing through the impeller blades is freed of foreign matter by centrifugal force.

AXEL W. KOGSTROM.